United States Patent [19]

Scholl et al.

[11] 4,248,771
[45] Feb. 3, 1981

[54] METAL COMPLEX REACTIVE DYESTUFFS
[75] Inventors: Walter Scholl, Cologne; Horst Nickel, Leverkusen, both of Fed. Rep. of Germany
[73] Assignee: Bayer Aktiengesellschaft, Leverkusen, Fed. Rep. of Germany
[21] Appl. No.: 957,074
[22] Filed: Nov. 2, 1978
[30] Foreign Application Priority Data Nov. 5, 1977 [DE] Fed. Rep. of Germany ....... 2749597

[51] Int. Cl.³ ............................................. C09B 45/00
[52] U.S. Cl. ................................................ 260/146 T
[58] Field of Search .................................... 260/146 T
[56] References Cited
U.S. PATENT DOCUMENTS

| 2,824,093 | 2/1958 | Benz et al. ........................ 260/146 T |
| 3,455,897 | 7/1969 | Barben ............................. 260/146 T |

FOREIGN PATENT DOCUMENTS 1530104 10/1978 United Kingdom .

Primary Examiner—Helen M. S. Sneed
Attorney, Agent, or Firm—Sprung, Felfe, Horn, Lynch & Kramer

[57] ABSTRACT

1:1 and 1:2 metal complex reactive dyestuffs based on at least one metallizable dyestuff of the formula

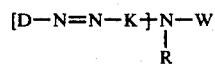

wherein
D = the radical of a metallizable diazo component with an OH group or COOH group in the o-position relative to the azo bridge,
K = the radical of a coupling component which couples in the o-position relative to a phenolic or enolic OH group,
W =

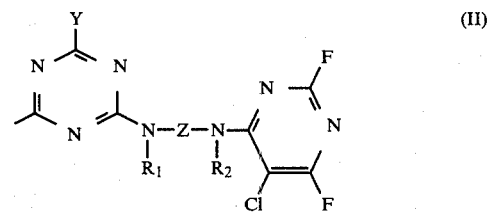

(II)

R, $R_1$ and $R_2$ = H or a substituent
Y = a group which can be split off, in particular halogen and
Z = a divalent organic radical,
and wherein
the group

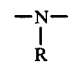

is bonded, directly or via a bridge member, to an aromatic ring C atom of D or K,
and their use for dyeing and printing materials containing hydroxyl groups and N-containing materials, such as cotton, wool and the like.

12 Claims, No Drawings

METAL COMPLEX REACTIVE DYESTUFFS

The invention relates to 1:1 and 1:2 metal complex reactive dyestuffs based on at least one metallisable dyestuff of the formula

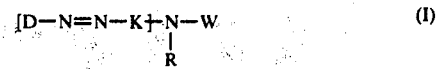 (I)

wherein
D = the radical of a metallisable diazo component with an OH group or COOH group in the o-position relative to the azo bridge,
K = the radical of a coupling component which couples in the o-position relative to a phenolic or enolic OH group,
W =

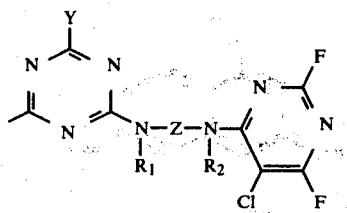 (II)

R, $R_1$ and $R_2$ = H or a substituent
Y = a group which can be split off, in particular halogen and
Z = a divalent organic radical,
and wherein
the group

is bonded, directly or via a bridge member, to an aromatic ring C atom of D or K.

Possible metals are, in particular, Cu, Cr and Co. In the case of Cu complexes, the 1:1 complexes are of particular importance. In the case of 1:2 complexes, the 2nd dyestuff radical can also be a radical of a dyestuff of the formula (I), in which case both radicals can be identical or different, or can be the radical of any desired metallisable dyestuff.

A large number of suitable metallisable dyestuffs are described in the literature.

Those radicals of dyestuffs of the formula (I) are, of course, also particularly suitable as the 2nd dyestuff radical, it being possible for the dyestuffs to be symmetric or unsymmetric. Dyestuffs of this type contain two radicals

in the molecule.

Particularly valuable dyestuffs are 1:2 Cr complex dyestuffs and 1:2 Co complex dyestuffs based on identical dyestuffs (I), and in particular mixtures of the 1:2 Cr complexes and 1:2 Co complexes of identical dyestuffs.

Symmetric or unsymmetric 1:2 Cr complexes and 1:2 Co complexes based on dyestuffs of the formula (I) and mixtures thereof are also preferred.

Those 1:2 Cr complexes and Co complexes based on identical or different azo dyestuffs which contain only one reactive group are also particularly valuable.

Quite generally, preferred dyestuffs are the 1:2 Cr complexes and 1:2 Co complexes of dyestuffs of the formula

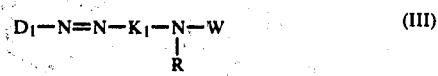 (III)

wherein
$D_1$ is an optionally substituted o-hydroxy-phenyl, o-carboxyphenyl radical or o-hydroxynaphthyl radical and

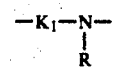

is the radical of an aminohydroxynaphthalene, aminophenol or pyrazolone containing amino groups, which couples in the o-position relative to the phenolic or enolic OH group.

In the case where

is bonded to K or $K_1$, examples of suitable radicals D or $D_1$ are o-hydroxyphenyl and o-carboxyphenyl as well as o-hydroxynaphthyl, which can contain substituents, such as sulpho, halogen, in particular Cl and Br, nitro, alkyl, in particular $C_1$-$C_4$-alkyl, and alkoxy, in particular $C_1$-$C_4$-alkoxy.

Examples of preferred radicals D or $D_1$ are 2-hydroxyphenyl, 2-hydroxy-5-nitro-phenyl, 2-hydroxy-3-sulpho-5-nitro-phenyl, 2-hydroxy-3-nitro-5-sulphophenyl, 2-hydroxy-5-sulphophenyl, 2-hydroxy-4-sulphophenyl, 2-hydroxy-3-chloro-5-sulpho-phenyl, 2-hydroxy-5-chlorophenyl, 2-hydroxy-3-sulpho-5-chlorophenyl, 2-hydroxy-3-nitro-5-chlorophenyl, 2-hydroxy-3-chloro-5-nitrophenyl, 2-hydroxy-3,5-dinitro-phenyl, 2-hydroxy-3,5-dichlorophenyl, 2-hydroxy-4-nitro-phenyl, 2-hydroxy-5-methyl-phenyl, 2-hydroxy-4-methyl-phenyl, 2-carboxy-phenyl, 2-hydroxy-4-sulpho-naphthyl and 2-hydroxy-4-sulpho-6-nitronaphthyl.

Examples of suitable radicals

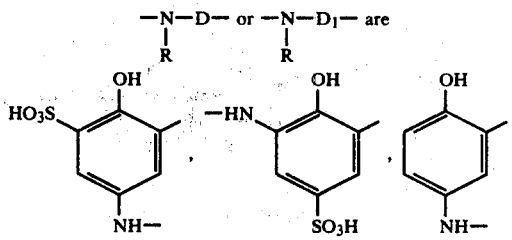

-continued

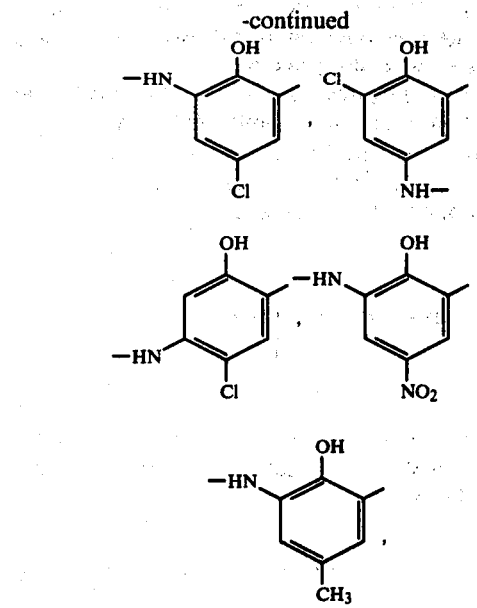

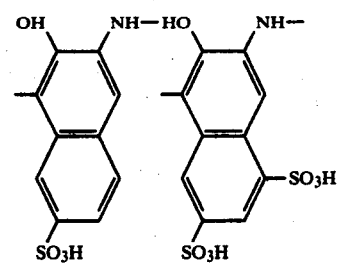

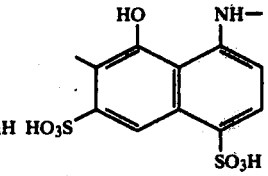

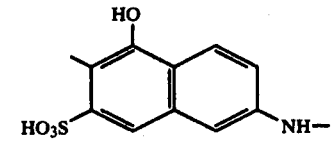

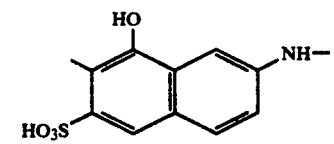

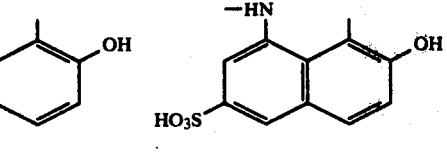

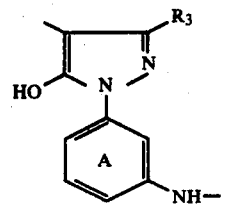

Examples of suitable radicals

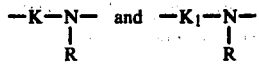

are o-hydroxy-amino-sulpho-naphthyl radicals and aminophenylpyrazolonyl and aminonaphthylpyrazolonyl radicals.

Examples of radicals of this type are

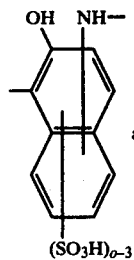 and 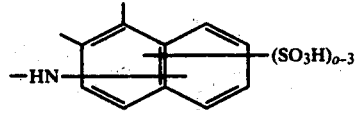

in particular $R_3 = C_1-C_4$-alkyl, COOH, CONH$_2$ or CN.

The ring A can contain further substituents, in particular Cl, Br, $C_1-C_4$-alkyl, $C_1-C_4$-alkoxy or sulpho.

Particularly suitable radicals of this type are

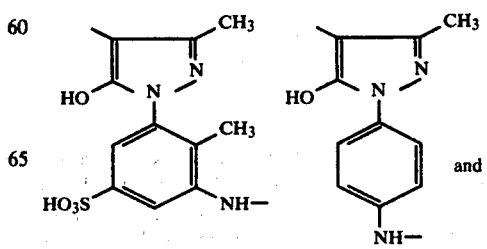

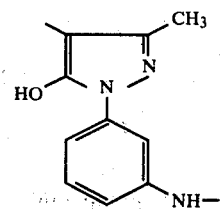

examples of radicals K and K$_1$ which are free from reactive groups are o-hydroxyphenyl radicals, o-hydroxynaphthyl radicals, o-hydroxy-sulphonaphthyl radicals, phenyl-pyrazolyl radicals and the radical of an acetoacetanilide.

Examples of radicals of this type are:

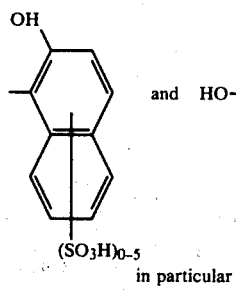

in particular

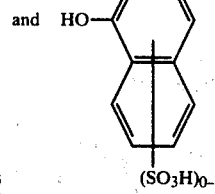

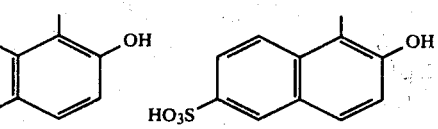

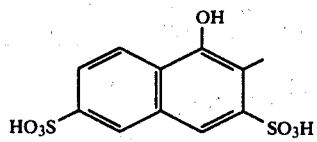

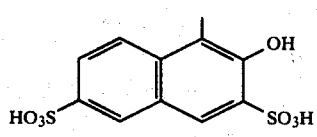

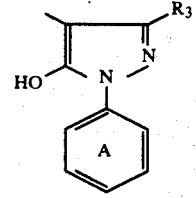

$R_3 = C_1-C_4$-alkyl, CN, COOH or CONH$_2$; it being possible for the ring A to contain further substituents, in particular Cl, Br, C$_1$-C$_4$-alkyl, C$_1$-C$_4$-alkoxy or sulpho.

Particularly suitable radicals of this type are

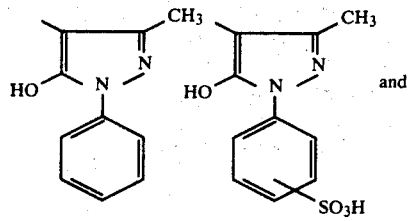

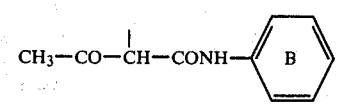

The ring B can contain further substituents, such as Cl, Br, C$_1$-C$_4$-alkyl, C$_1$-C$_4$-alkoxy or sulpho.

Particularly suitable radicals of this type are

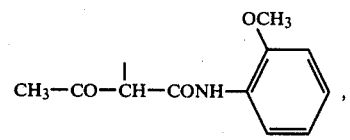

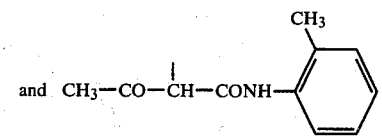

Examples of suitable radicals R–R$_2$ are H, alkyl, in particular C$_1$-C$_4$-alkyl, and aralkyl.

Suitable radicals Y are, in particular, halogen, such as F, Cl and Br.

Suitable bridge members Z are, in particular, optionally substituted phenylene, naphthylene and alkylene. Substituents which may be mentioned here are: sulpho, C$_1$-C$_4$-alkyl, C$_1$-C$_4$-alkoxy and halogen. The following bridge members may be mentioned as examples:

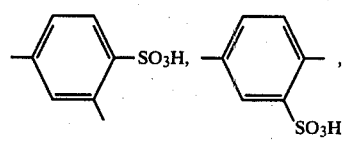

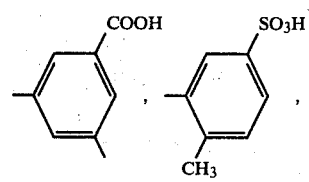

—CH$_2$—CH$_2$—, —CH$_2$—CH$_2$—CH$_2$—, —CH$_2$—CH—CH$_3$,

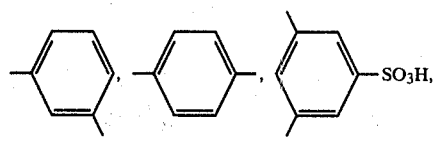

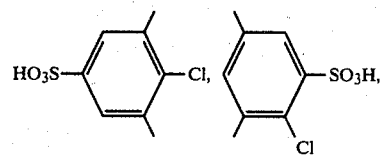

-continued
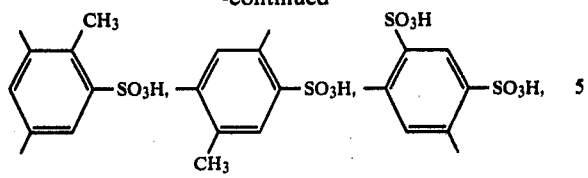
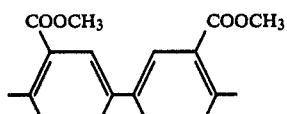
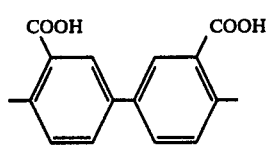
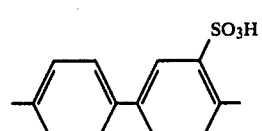
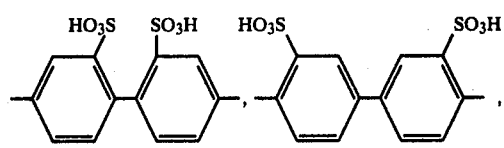
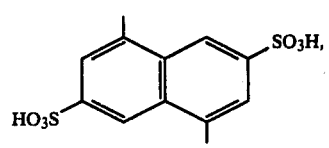
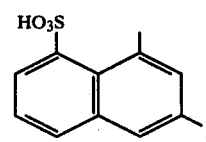
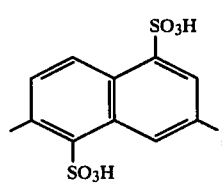
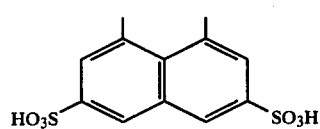
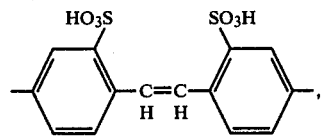
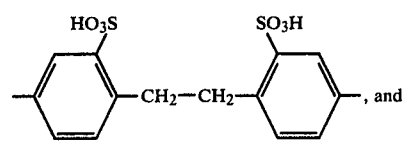, and
-continued
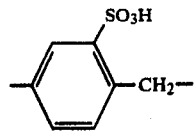
Preferred dyestuffs are the 1:2 Cr complexes and 1:2 Co complexes of dyestuffs of the formulae:
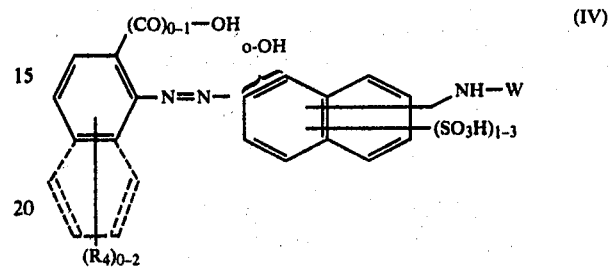 (IV)
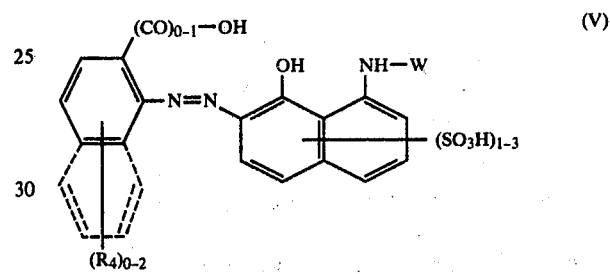 (V)
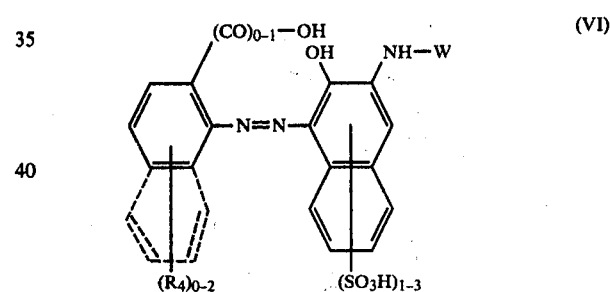 (VI)
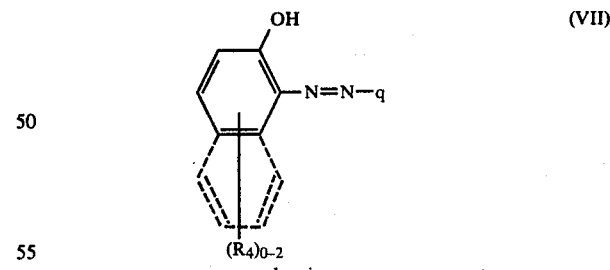 (VII)
wherein
q = 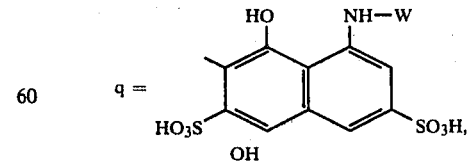
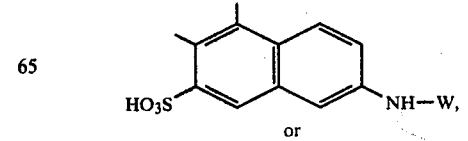
or -continued

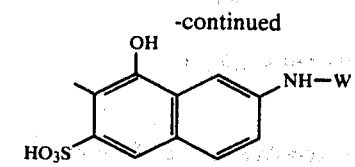

The dyestuffs IV–VIII which contain H, NH$_2$, acetylamino or benzoylamino instead of —NH—W are particularly suitable as the second component for metal complex dyestuffs with only one reactive group, in particular for those with the particular dyestuffs IV to VIII.

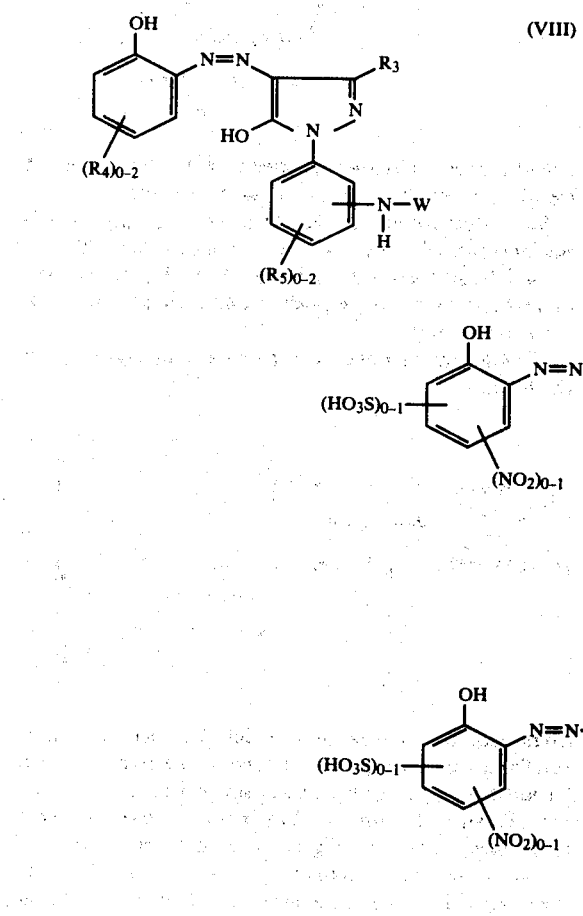

wherein

—N(H)—W = has the meaning indicated in formula (I),

R$_4$ = NO$_2$, SO$_3$H or Cl,
R$_5$ = SO$_3$H, halogen, in particular Cl, or C$_1$–C$_4$-alkyl and
R$_3$ = C$_1$–C$_4$-alkyl, CN, COOH or CONH$_2$.
Furthermore, those dyestuffs of the formulae indicated above, in which

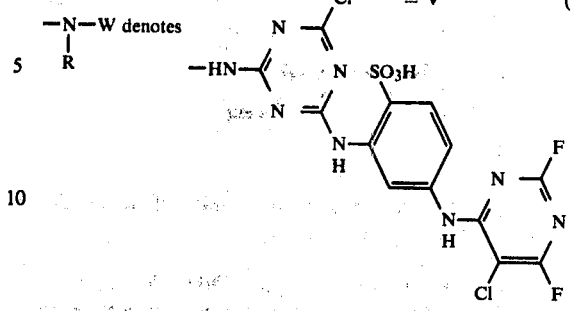

are preferred.

Amongst the dyestuffs (III)–(VIII), those symmetric or asymmetric 1:2 Cr complexes or 1:2 Co complexes in which the 2nd dyestuff is also a dyestuff of the general formula (III)–(VIII), or mixtures of these Cr and Co complexes, are preferred.

The following are examples of dyestuffs which are preferred as the second component in the 1:2 Cr mixed complexes and 1:2 Co mixed complexes

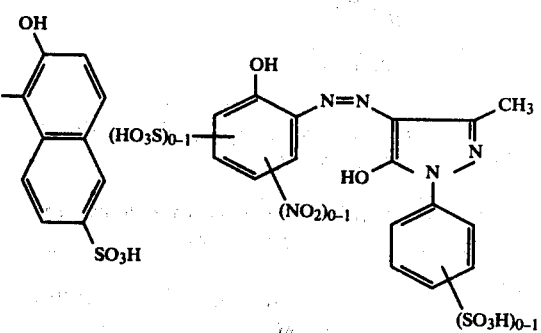

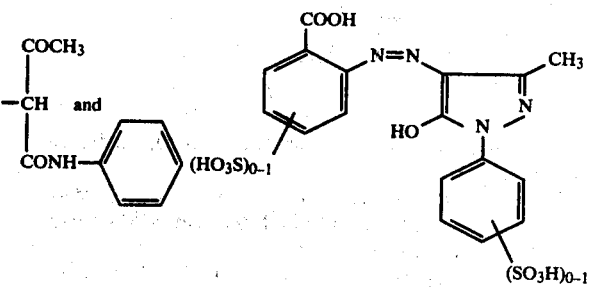

Further suitable dyestuffs are described, for example, in Belgian Pat. No. 664,682.

The cobalt mixed complexes which are obtained by forming the mixed cobalt complex of a dyestuff of the formula (IV) and of a dyestuff of the formula (VIII) are also particularly suitable dyestuffs. The ratio of (IV) to (VIII) can vary within wide limits and is appropriately 0.1:1 to 0.1, preferably 0.5:1 to 1:0.5.

The dyestuffs are prepared in a manner which is in itself known:

(A) 1:1 or 1:2 metal complexes based on at least one metallisable dyestuff of the formula $$[D\text{—}N\text{=}N\text{—}K]\text{—}NH \quad (X)$$
$$\phantom{[D\text{—}N\text{=}N\text{—}K]\text{—}N}|\phantom{H}$$
$$\phantom{[D\text{—}N\text{=}N\text{—}K]\text{—}N}R\phantom{H}$$

are reacted with a compound of the formula

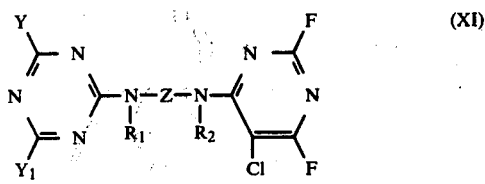

wherein Y₁ = a radical which can be split off, in particular halogen, such as Cl, preferably with 1 mol of (XI) per —NH—R group.

The 1:2 complexes are prepared in a known manner by metallising the corresponding azo dyestuffs.

The compound (XI) and its preparation are described in DT-OS (German Published Specification) No. 2,607,028.

(B) 1:1 or 1:2 metal complexes of dyestuffs of the formula (X) are first reacted with 1 mol, per —NH—R group, of a compound (XII)

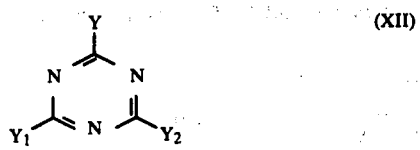

wherein Y, Y₁ and Y₂ = a radical which can be split off, in particular halogen, such as Cl, and the products are then reacted with the equivalent amount

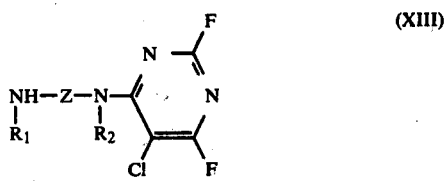

wherein R₁, Z and R₂ have the meaning indicated above.

The calculated amount of a solution of cyanuric chloride in an organic solvent, such as acetone, or of an aqueous suspension is introduced, for example, into the solution or suspension, adjusted to 0° C., of the metal complex dyestuff, the pH we kept at 4–7 with an alkali, for example dilute sodium carbonate solution. The mixture is stirred at 0° until the starting dyestuff has disappeared, and the calculated amount of an aqueous solution or aqueous paste of

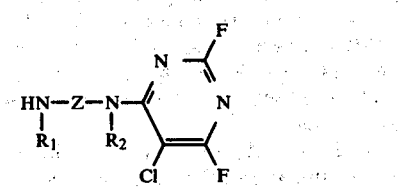

is then introduced. The pH of the reaction solution is kept at 4–6.5 by adding an alkali, such as dilute sodium carbonate solution, the reaction solution being warmed to 40°–50°. The reaction has ended after 2–5 hours.

(C) Dyestuffs of the formula

are first reacted according to one of the processes described in A and B to give a reactive dyestuff of the formula

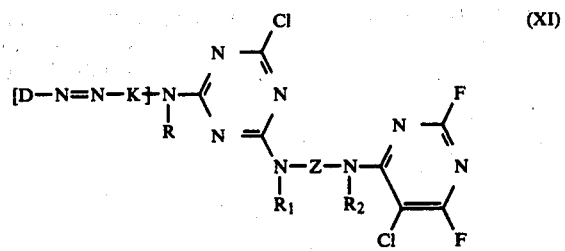

and the product is then converted into the 1:1 or 1:2 metal complex dyestuff in a known manner.

(D) Alternatively, a suitable coupling component is first reacted with the reactive component according to one of the processes described in A or B, a diazo component is coupled to the product and the coupling product is metallised.

(E) Chromium mixed complex reactive dyestuffs of the formula

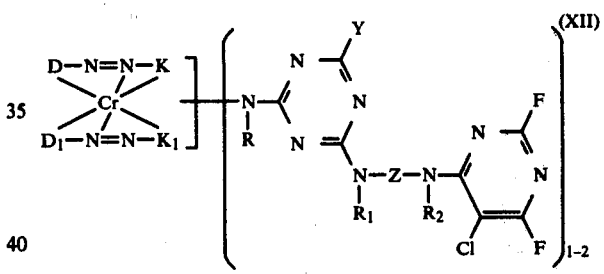

are prepared by a process in which the 1:1 Cr complex, free from reactive groups, of one of the two monoazo dyestuffs is prepared by customary processes, this complex is reacted with the 2nd monoazo dyestuff, free from reactive groups, to give the chromium mixed complex and finally this complex is converted into the reactive dyestuff by one of the processes described in A and B.

The new dyestuffs are suitable for dyeing and printing materials containing Hydroxyl groups and N-containing materials, such as cotton, wool and the like, by the customary processes.

The formulae indicated in the description are those of the free acids, unless otherwise indicated. In general, the salts, in particular the alkali metal salts, and preferably the sodium salts, potassium salts or lithium salts, are obtained in the preparation and dyeing is also generally carried out with these salts.

EXAMPLE 1

A solution of 18.5 parts by weight of cyanuric chloride in 140 parts by volume of acetone is added dropwise, at 0° C. in the course of 30 minutes, to a solution of the 1:2 Co complex obtained from 0.1 mol of the monoazo dyestuff of the formula

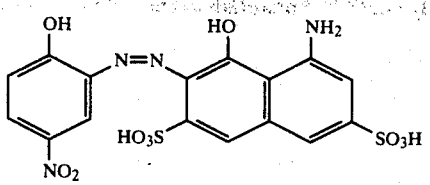

in 600 parts by volume of water. The pH is kept at 4–5.5 with about 28 parts by volume of 20% strength by volume sodium carbonate solution and the mixture is stirred at 0° C. for 2 hours. 0.1 Mol of the reactive component of the formula

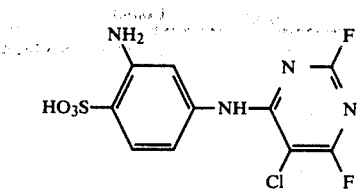

(prepared by reacting 2,4,6-trifluoro-5-chloropyrimidine with 2,4-diamino-benzene-1-sulphonic acid) is then introduced and the mixture is stirred, warmed to 40°–50° C. and stirred at 40°–50° for 6 hours, the pH being kept at 5–6 with 20% strength by volume sodium carbonate solution. The mixture is then clarified and the filtrate is evaporated in a rotary evaporator at 70°–80°.

When pulverised, the dyestuff is a black powder which gives a fast reactive print in corinth shades on cotton and viscose staple.

EXAMPLE 2

1,000 parts by volume of an aqueous solution of 0.1 mol of the reactive component

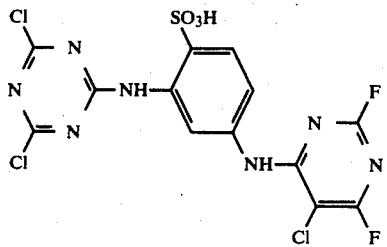

are added dropwise, at 40°–50° C. and at pH 6.5, to a solution of the 1:2 Cr complex obtained from 0.1 mol of the monoazo dyestuff of the formula

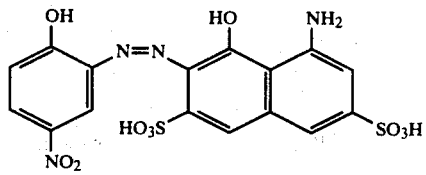

in 600 parts by volume of water. The pH is kept at 5.5–6.5 with 20% strength by volume sodium carbonate solution and the mixture is stirred at 40°–50° for 5 hours. After clarifying, the filtrate is evaporated to dryness in a rotary evaporator at 70° C. When pulverised, the dyestuff is a black powder which gives, under printing conditions for reactive dyestuffs, a greenish-tinged grey with good fastness properties on cotton and viscose staple.

The reactive component is prepared by stirring 0.1 mol of the compound

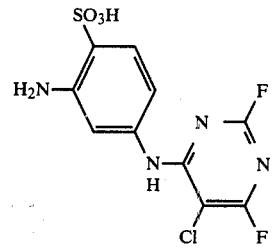

in 520 parts by volume of water and cooling the mixture to 0° C. with 140 parts by weight of ice. A solution of 18.5 parts by weight of cyanuric chloride in 140 parts by volume of acetone is added dropwise to the solution in the course of 45 minutes, the pH being kept at 5.5–6.5 with 20% strength by volume sodium carbonate solution. The mixture is subsequently stirred at 0°–2° C. and pH 5.5–6.5 for 2 hours and is clarified.

EXAMPLE 3

A solution of the 1:2 Cr complex obtained from 0.2 mol of the monoazo dyestuff of the formula

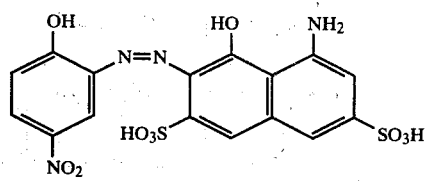

and 1:2 Co complex obtained from 0.1 mol of the same monoazo dyestuff in 1,150 parts by volume of water is cooled to 0° by external cooling. The pH of the solution is 6. A suspension of 55.6 parts by weight of cyanuric chloride in 100 parts by volume of water, 200 parts by weight of ice and 4.15 parts by weight of a commercially available nonionic emulsifier based on fatty alcohol polyglycol ether is then introduced. The mixture is stirred at 0° C. for 2 hours; the pH is kept at 5–6 with 20% strength by volume sodium carbonate solution. Thereafter, 0.3 mol of the reactive component

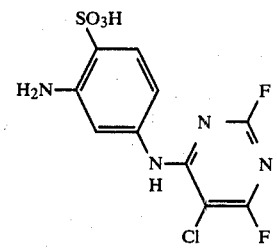

is added in the form of an aqueous paste and the mixture is warmed to 40°–50° C. and stirred at 40°–50° C. for 4 hours, the pH of the reaction solution being kept at 5–6 with 20% strength by volume sodium carbonate solution. The reaction solution is clarified with a little active charcoal and the solution is evaporated in a rotary evaporator at 70° C. After pulverising, a black powder is obtained which gives neutral black reactive prints with good fastness properties on cotton and viscose staple.

In a manner analogous to that described in Examples 1–3, using the corresponding starting compounds gives the dyestuffs described in the table which follows, which dye cellulose materials in the colour shades indicated.

| Dyestuff | Metal complex | Colour |
|---|---|---|
| [structure: 4-sulfo-6-nitro-2-hydroxynaphthyl–N=N–1-hydroxy-3-sulfo-naphthyl with 8-NH–X, 6-SO₃H] | 1:2 Cr | greenish-tinged black |
| [structure: 2-carboxyphenyl–N=N–1-hydroxy-3-sulfo-6-NH–X-naphthyl] | 1:2 Cr | brown |
| [structure: 2-hydroxy-3-sulfo-5-nitrophenyl–N=N–1-hydroxy-3-sulfo-6-NH–X-naphthyl] | 1:2 Co | brown |
| [structure: 2-hydroxy-5-nitrophenyl–N=N–naphthyl with OH, NH–X, SO₃H] | 1:2 Co | brown |
| [structure: 2-hydroxy-5-nitrophenyl–N=N–naphthyl with OH, NH–X, 2×SO₃H] | 1:2 Co | brown |
| [structure: pyrazolone dye: 2-hydroxy-5-sulfo-phenylazo-pyrazolone with 3-CH₃, N-(2-methyl-4-sulfo-6-NH–X-phenyl)] | 1:2 Co | brownish-tinged yellow |

-continued
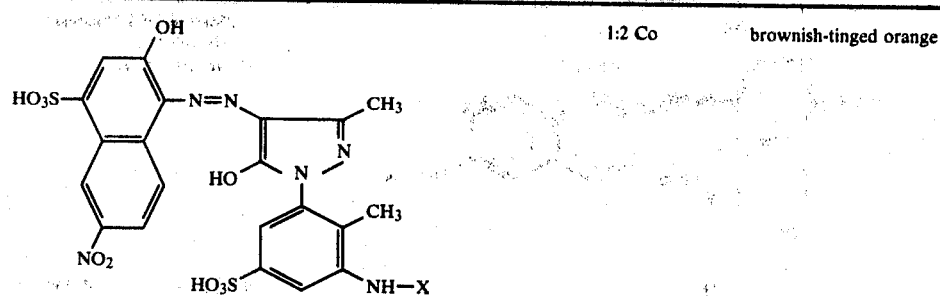 1:2 Co  brownish-tinged orange
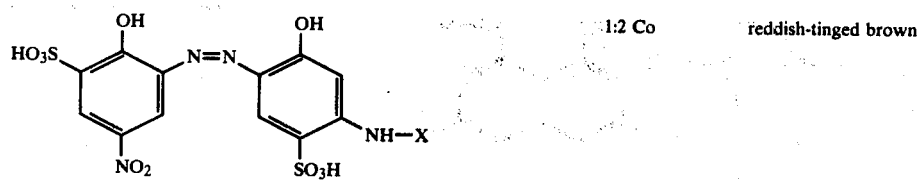 1:2 Co  reddish-tinged brown
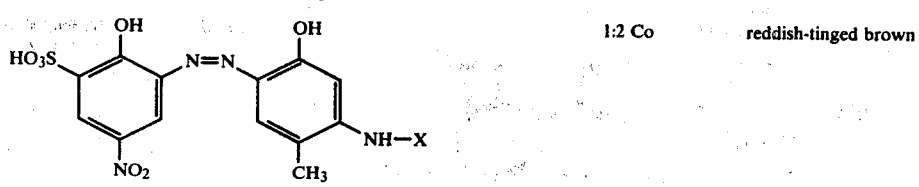 1:2 Co  reddish-tinged brown
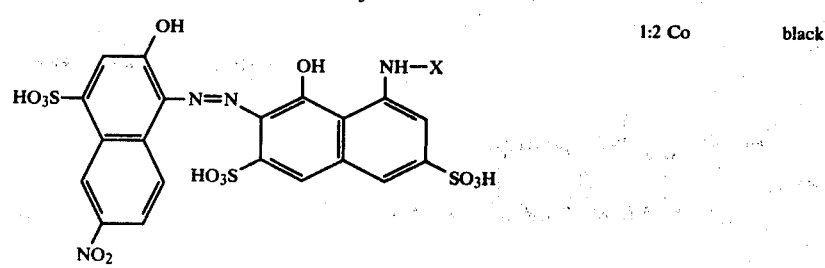 1:2 Co  black
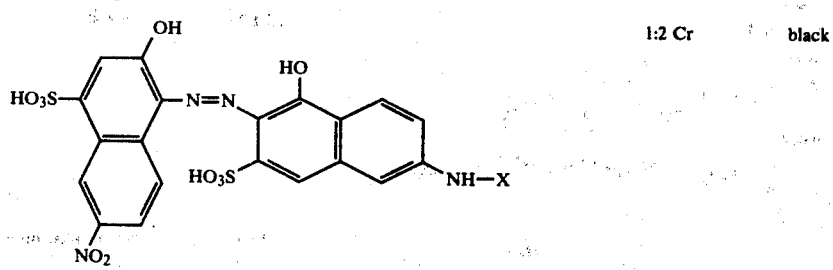 1:2 Cr  black
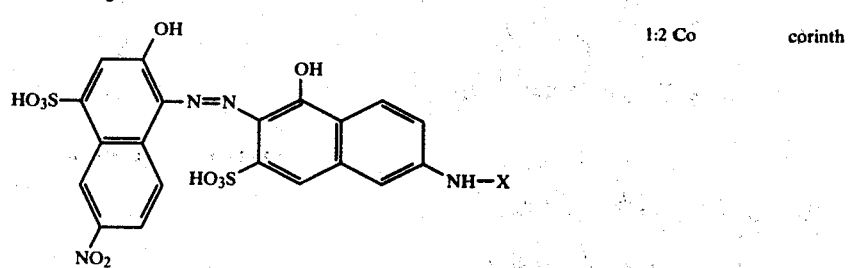 1:2 Co  corinth
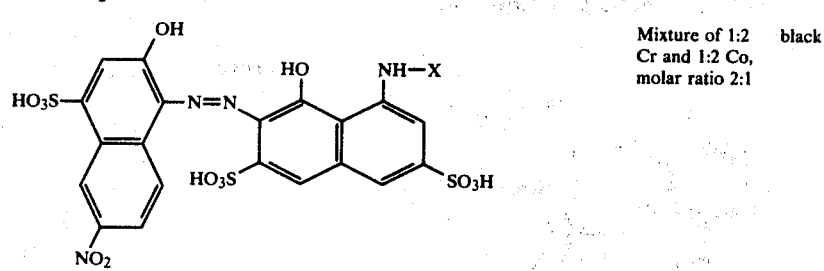 Mixture of 1:2 Cr and 1:2 Co, molar ratio 2:1  black

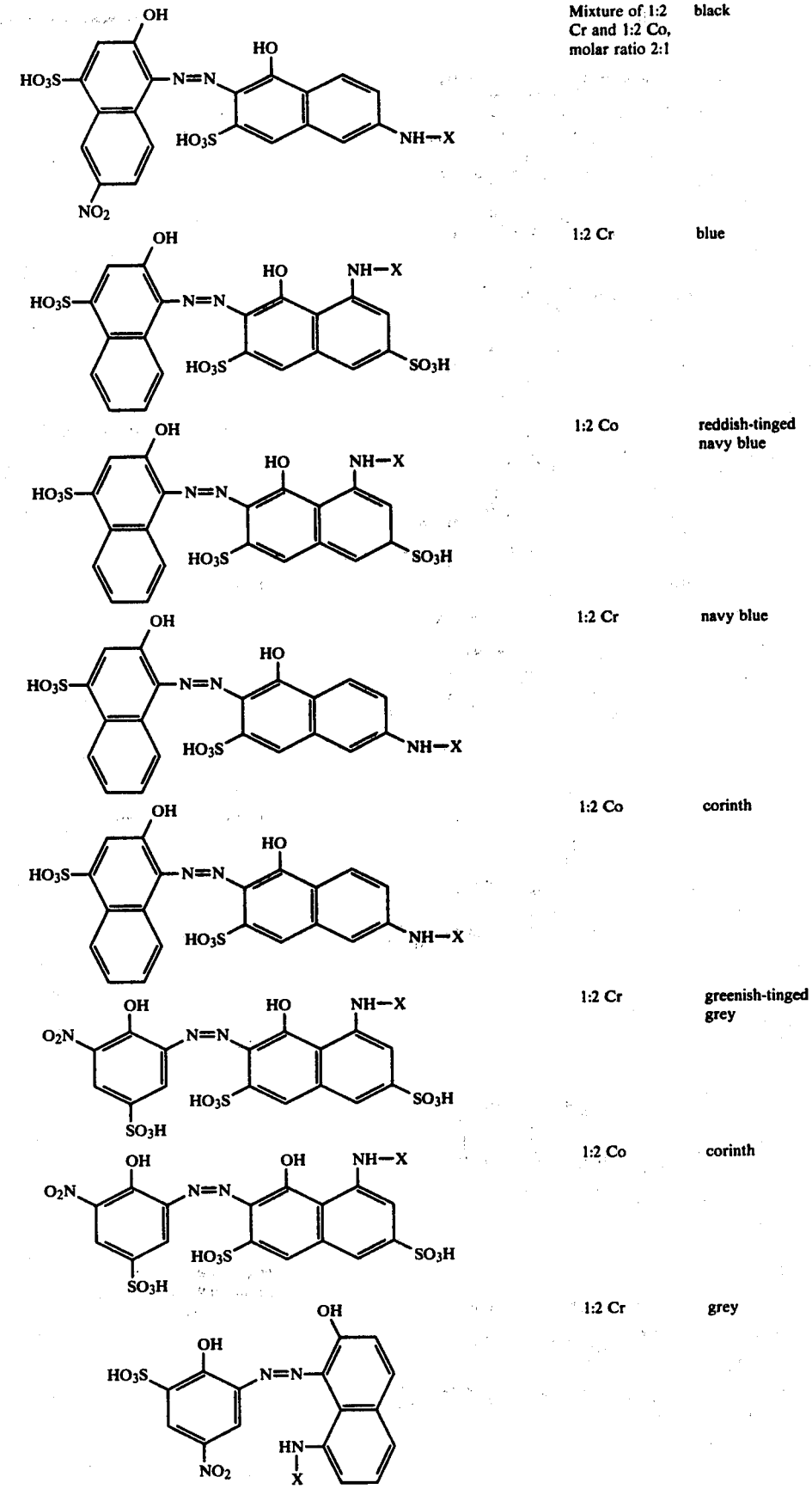

-continued
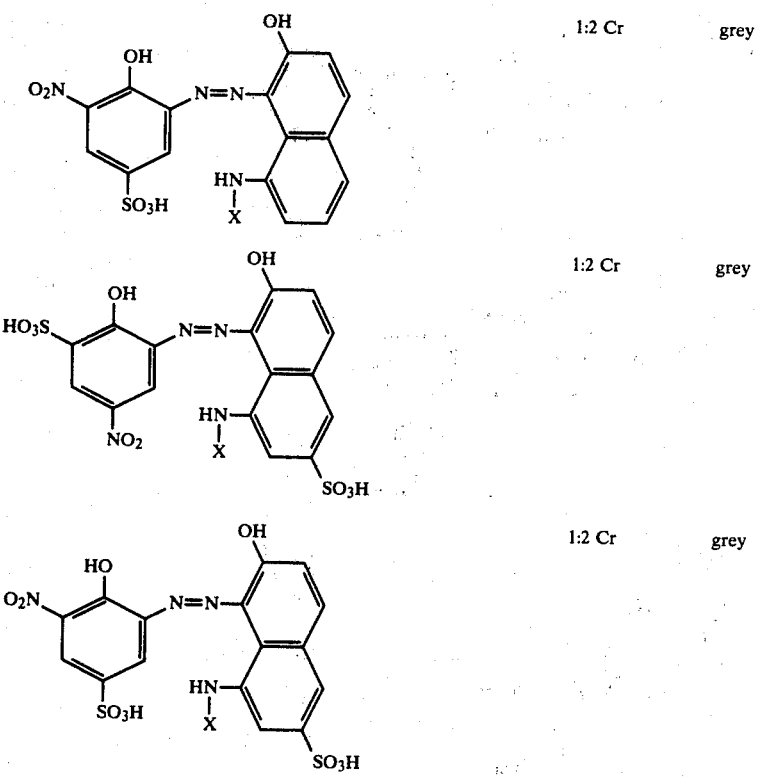
| | |
|---|---|
| 1:2 Cr | grey |
| 1:2 Cr | grey |
| 1:2 Cr | grey |
Formation of the mixed cobalt complex,
Molar ratio 1:1
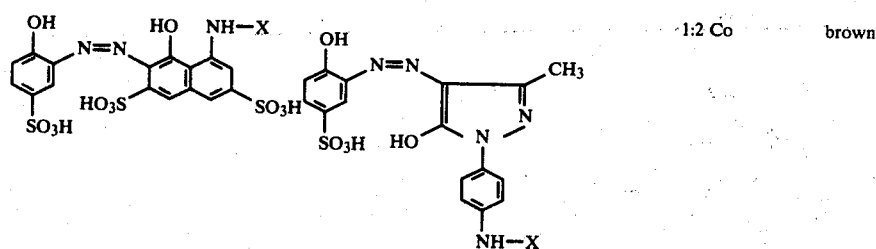
| Metal complex | Colour |
|---|---|
| 1:2 Co | brown |
Mixture of the 1:2 Co complexes,
Molar ratio 1:1
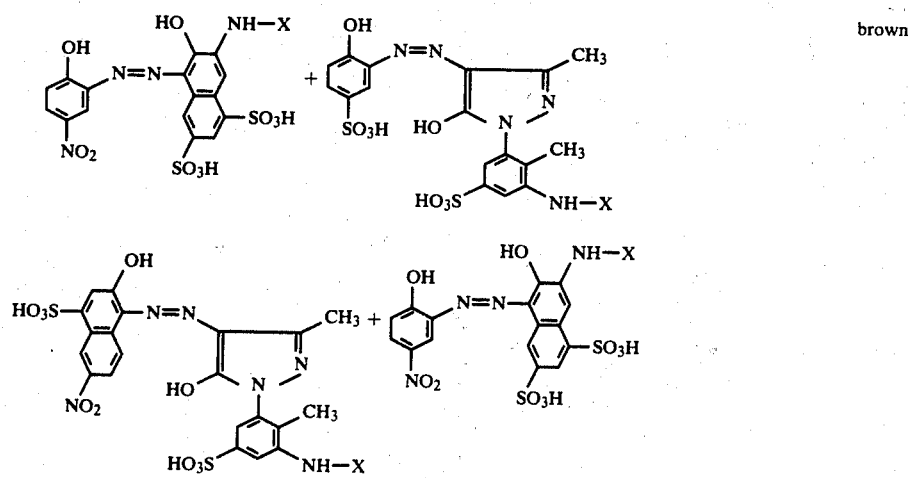
| Colour |
|---|
| brown |

-continued
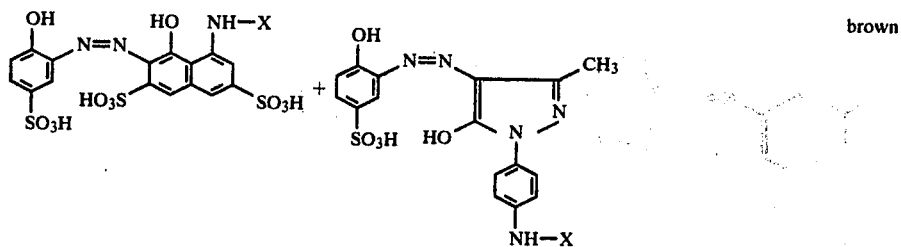 brown
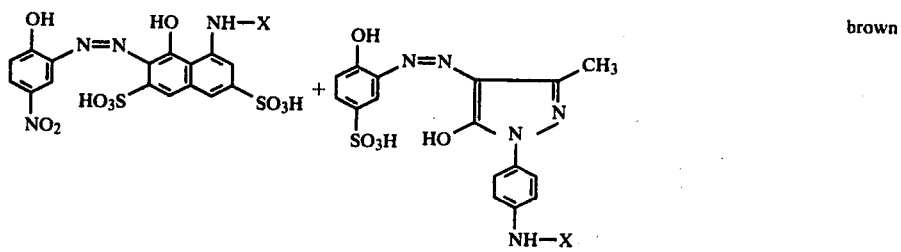 brown
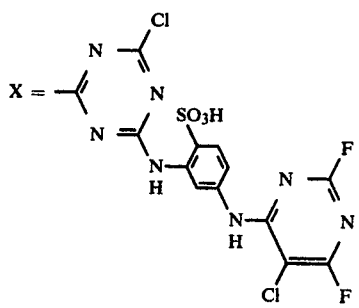
| Dyestuff | Metal complex | Colour |
|---|---|---|
| | 1:2 Cr | black |
| | 1:2 Co | black |
| | 1:2 Co | brown |

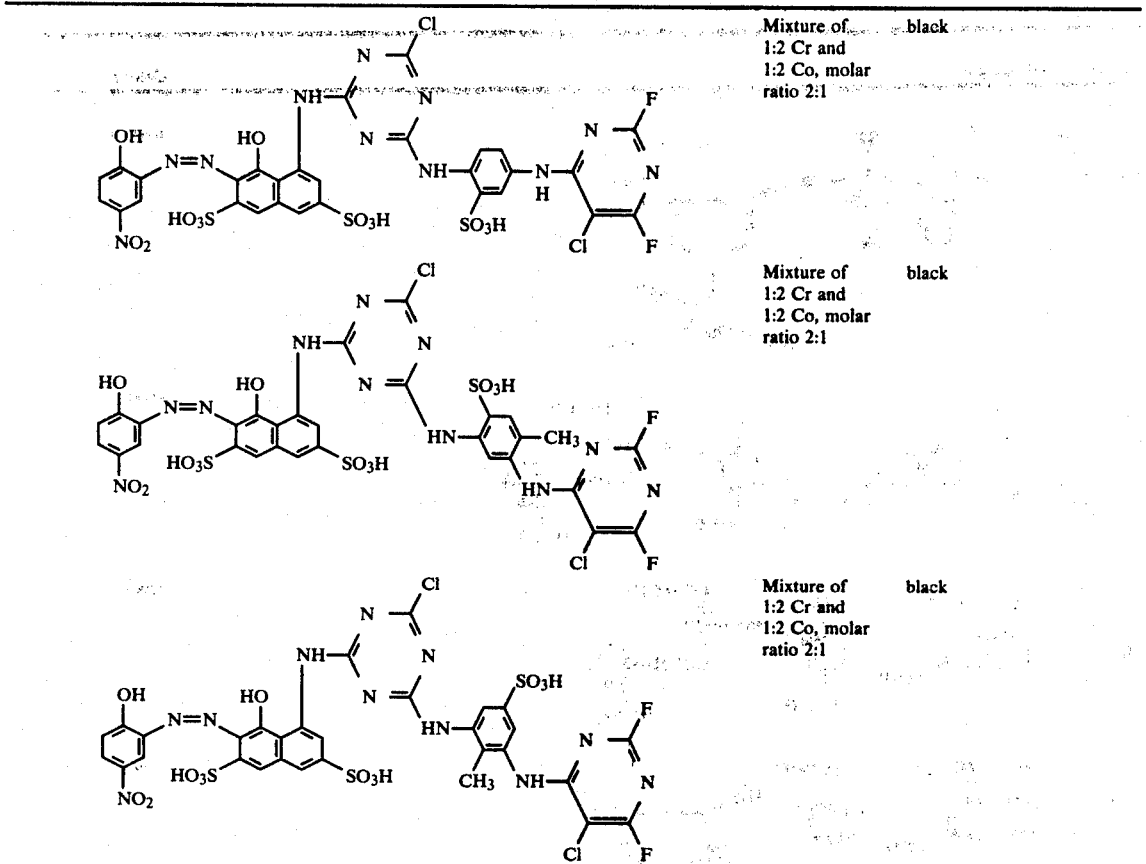

| | Mixture of 1:2 Cr and 1:2 Co, molar ratio 2:1 | black |
| | Mixture of 1:2 Cr and 1:2 Co, molar ratio 2:1 | black |
| | Mixture of 1:2 Cr and 1:2 Co, molar ratio 2:1 | black |

EXAMPLE 4

0.1 mol of the 1:1 Cr complex of the monoazo dyestuff of the formula

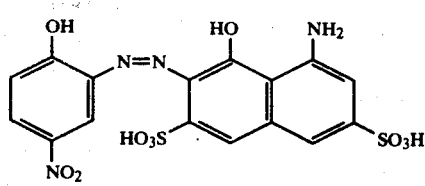

and 0.1 mol of the monoazo dyestuff of the formula

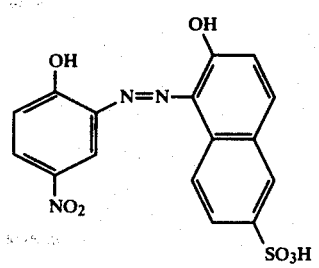

are stirred in 700 parts by volume of water, the mixture is warmed to 70° and the dyestuffs are converted into the chromium mixed complex at pH 6–7 in the course of 2 hours. The mixture is clarified with a little active charcoal, 1,000 parts by volume of an aqueous solution of 0.1 mol of

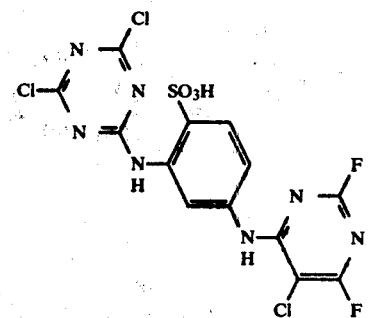

(preparation described in Example 2) are added and the mixture is stirred at 40°–50° C. for 5 hours, the pH being kept at 5–6 with 20% strength by volume sodium carbonate solution.

In order to isolate the reactive dyestuff, the mixture is evaporated in a rotary evaporator at a water bath temperature of 70°. A black dyestuff powder is obtained which, under printing conditions for reactive dyestuffs, gives a black with good fastness properties on cotton.

In an analogous manner, using the corresponding starting compounds gives the dyestuffs described in the table which follows, which dye cellulose materials in the colour shades indicated.

| Chromium mixed complex | Colour |
|---|---|
| 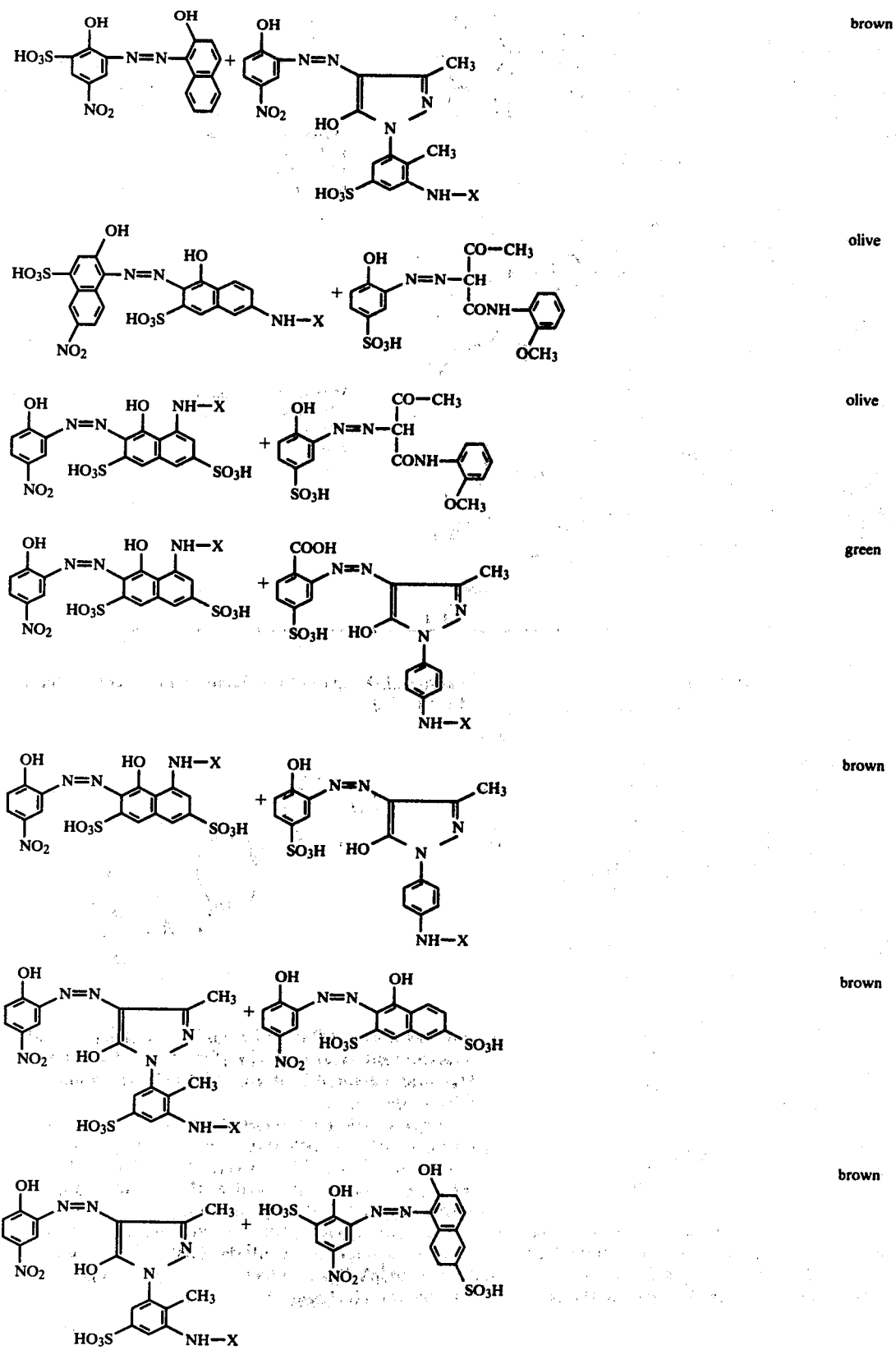 | brown |
| | olive |
| | olive |
| | green |
| | brown |
| | brown |
| | brown |

| Chromium mixed complex | Colour |
|---|---|
| (structure) | brown |
| (structure) | brown |
| (structure) | brown |
| (structure) | brown |
| (structure) | brown |
| (structure) | black |

| Chromium mixed complex | Colour |
|---|---|
| 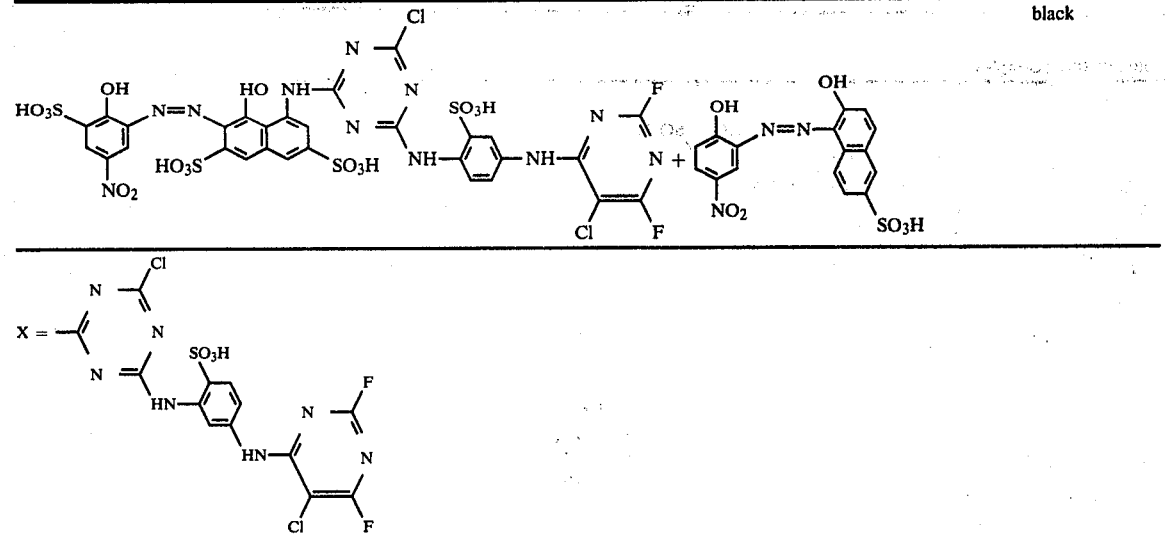 | black |

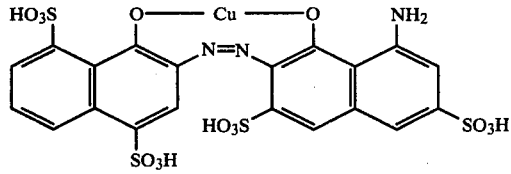

EXAMPLE 5

Cellulose fabric is printed with a printing paste consisting of 80 g of the dyestuff from Example 3, 150 g of urea, 20 g of sodium bicarbonate, 10 g of the sodium salt of m-nitrobenzenesulphonic acid, 240 g of water and 500 g of 4% strength alginate thickener, dried, steamed at 100° C. for 2 minutes and rinsed with hot water. A neutral black print with good fastness to washing and light is obtained.

EXAMPLE 6

0.1 mol of the copper complex of the aminoazo dyestuff of the formula

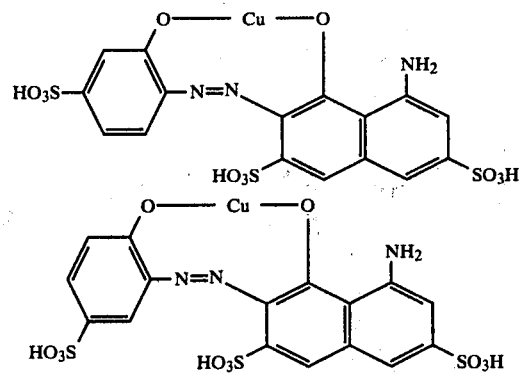

prepared in a known manner by coupling diazotised 2-amino-naphthalene-4,8-disulphonic acid with 1-acetylamino-8-hydroxynaphthalene-3,6-disulphonic acid, oxidative coppering of the coupling product and alkaline saponification of the N-acetyl group, are dissolved in 750 ml of water under neutral conditions. A solution of 0.1 mol of 4-(2,4-difluoro-5-chloropyrimidyl)-amino-2-aminobenzenesulphonic acid in about 1,000 ml of water is added dropwise to 0.1 mol of a cyanuric chloride suspension in ice-water at 0° and the pH of the mixture is kept at 5.5 by adding 20% strength sodium carbonate solution dropwise, until the reaction has ended. The mixture is then combined with the dyestuff solution described above. A pH value of 5–6 is maintained, at 40°, by adding 20% strength sodium carbonate solution dropwise, until the condensation reaction has ended. The product is isolated in the customary manner, for example by salting out with sodium chloride. The dried dyestuff is a dark powder which dissolves in water giving a blue-coloured solution and dyes cotton by the known dyeing and printing processes for reactive dyestuffs in dark blue shades with a good degree of fixing.

If instead of 4-(2,4-difluoro-5-chloropyrimidyl)-amino-2-aminobenzenesulphonic acid, the equivalent amount of 5-(2,4-difluoro-5-chloropyrimidyl)-amino-2-aminobenzenesulphonic acid is used for the preparation of the reactive component, a similar dark blue reactive dyestuff is obtained.

If the copper complex compounds of the formulae

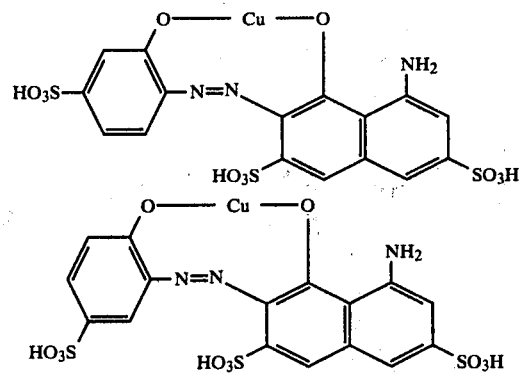

prepared in the customary manner are used as the dyestuff component, after reaction with the reactive components described, reactive dyestuffs are obtained which dye cotton in violet shades.

If the copper complex of the disazo dyestuff of the formula

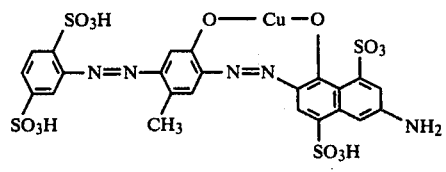

is used as the dyestuff component and the reaction is carried out with the reactive components described above, dark blue reactive dyestuffs are obtained.

We claim:

1. 1:1 and 1:2 metal complex reactive dyestuffs based on at least one metallisable dyestuff of the formula

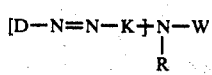

wherein
- D = the radical of a metallisable diazo component with an OH group or COOH group in the o-position relative to the azo bridge,
- K = the radical of a coupling component which couples in the o-position relative to a phenolic or enolic OH group,

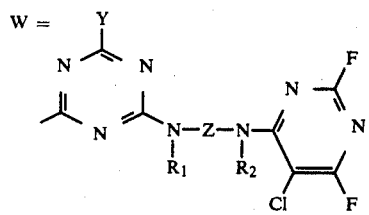

R, $R_1$ and $R_2$ = H or a substituent
Y = halogen and
Z = phenylene, naphthylene and $C_1$-$C_3$-alkylene which are unsubstituted or substituted by sulfo, $C_1$-$C_4$-alkyl, $C_1$-$C_4$-alkoxy or halogen, and wherein the group

is bonded, directly or via a bridge member, to an aromatic ring C atom of D or K.

2. Symmetric 1:2 metal complex dyestuffs of claim 1.

3. Dyestuffs of claim 1 or 2, with Cr or Co as the metal.

4. 1:2 Cr complexes and 1:2 Co complexes based on a dyestuff of the formula

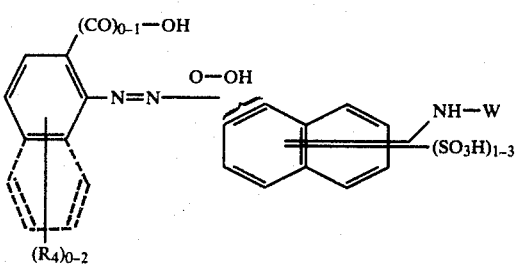

wherein
$R_4$ = $NO_2$, $SO_3H$ or Cl and
W has the meaning indicated in claim 1.

5. 1:2 Cr complexes and 1:2 Co complexes based on a dyestuff of the formula

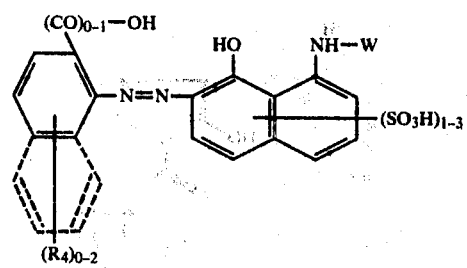

wherein $R_4$ and W have the meaning indicated in claim 4.

6. 1:2 Cr complexes and 1:2 Co complexes based on a dyestuff of the formula

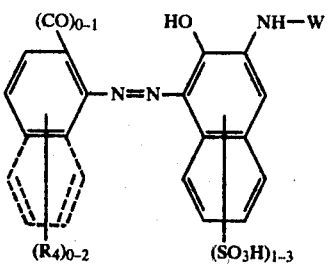

wherein $R_4$ and W have the meaning indicated in claim 4.

7. 1:2 Cr complexes and 1:2 Co complexes based on a dyestuff of the formula

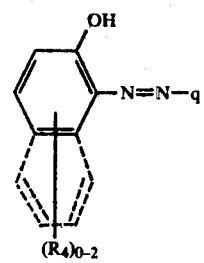

wherein q =

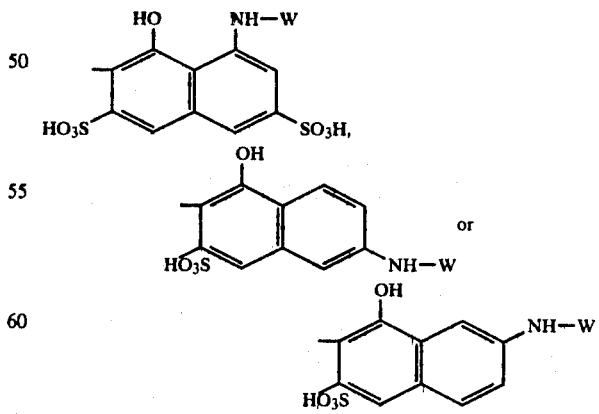

and wherein $R_4$ and W have the meaning indicated in claim 4.

8. 1:2 Cr complexes and 1:2 Co complexes based on a dyestuff of the formula

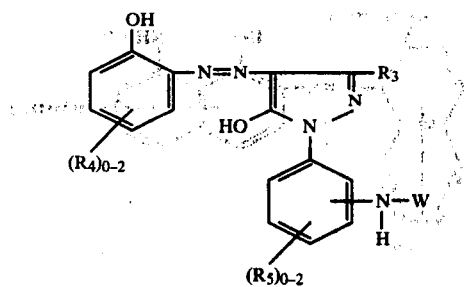

wherein $R_3 = C_1$–$C_4$-alkyl, CN, COOH or $CONH_2$,
$R_5$ denotes $SO_3H$, halogen or $C_1$–$C_4$-alkyl and
$R_4$ and W have the meaning indicated in claim 4.

9. Symmetric 1:2 Cr complexes and 1:2 Co complexes based on the dyestuffs of claim 4.

10. Unsymmetric 1:2 Cr complexes and 1:2 Co complexes based in each case on a dyestuff of claim 5 and a corresponding dyestuff of claim 5 in which the group —NH—W is replaced by H, $NH_2$, acetylamino or benzoylamino.

11. Mixtures of symmetric 1:2 Cr complexes and 1:2 Co complexes of dyestuffs according to claims 2 or 3.

12. 1:2 Cr complexes and 1:2 Co complexes based on a dyestuff of claim 8 wherein $R_5$ is Cl.

* * * * *